United States Patent [19]

Ballas, Sr.

[11] 4,156,967
[45] Jun. 5, 1979

[54] ROTARY CUTTING ASSEMBLY
[75] Inventor: George C. Ballas, Sr., Houston, Tex.
[73] Assignee: Weed Eater, Inc., Houston, Tex.
[21] Appl. No.: 746,685
[22] Filed: Dec. 2, 1976
[51] Int. Cl.² ............................................ A01D 55/18
[52] U.S. Cl. .............................. 30/276; 56/DIG. 18; 310/68 D
[58] Field of Search ................... 30/276, 347; 56/12.7; 310/68 D; 56/DIG. 18

[56] References Cited

U.S. PATENT DOCUMENTS

| 2,058,353 | 10/1936 | Randolph | 56/DIG. 18 |
| 3,527,971 | 9/1970 | Means | 310/68 D |

FOREIGN PATENT DOCUMENTS 1281450  12/1961  France .................................. 30/276

Primary Examiner—Jimmy C. Peters

[57] ABSTRACT

Apparatus for cutting, trimming, and edging vegetation, and the like, is provided with a rotatable disc-like head having at least one string-like cutting member removably attached thereto and replaceably extending from its periphery for cutting adjacent vegetation and the like. Metallic bearing elements for enhancing the cutting life of cutting strings are provided, as well as drive means for increasing cutting efficiency.

5 Claims, 17 Drawing Figures

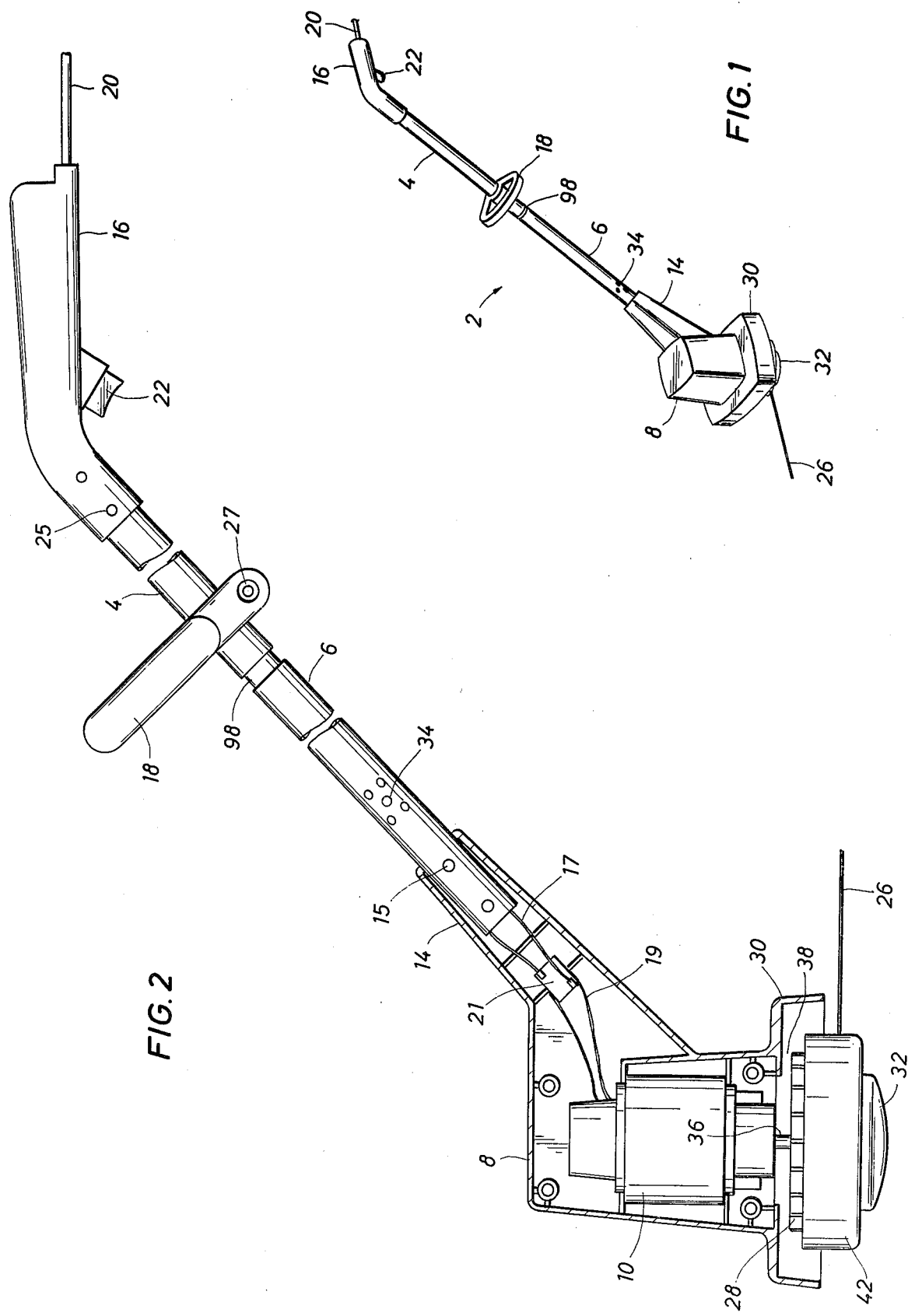

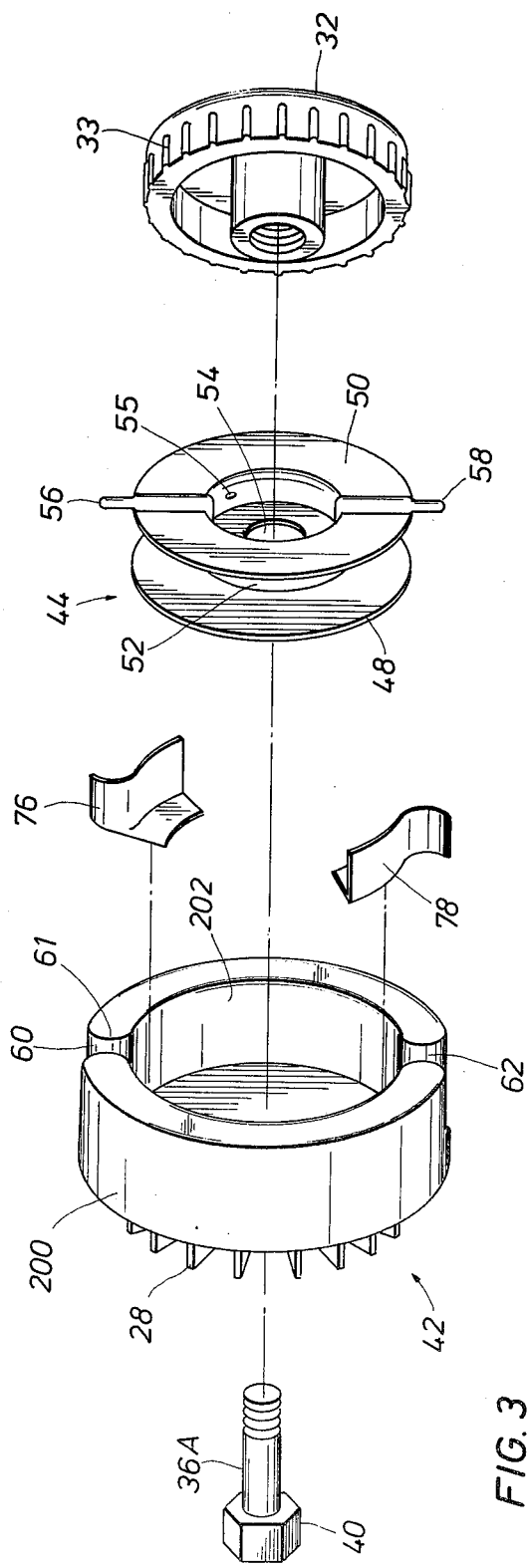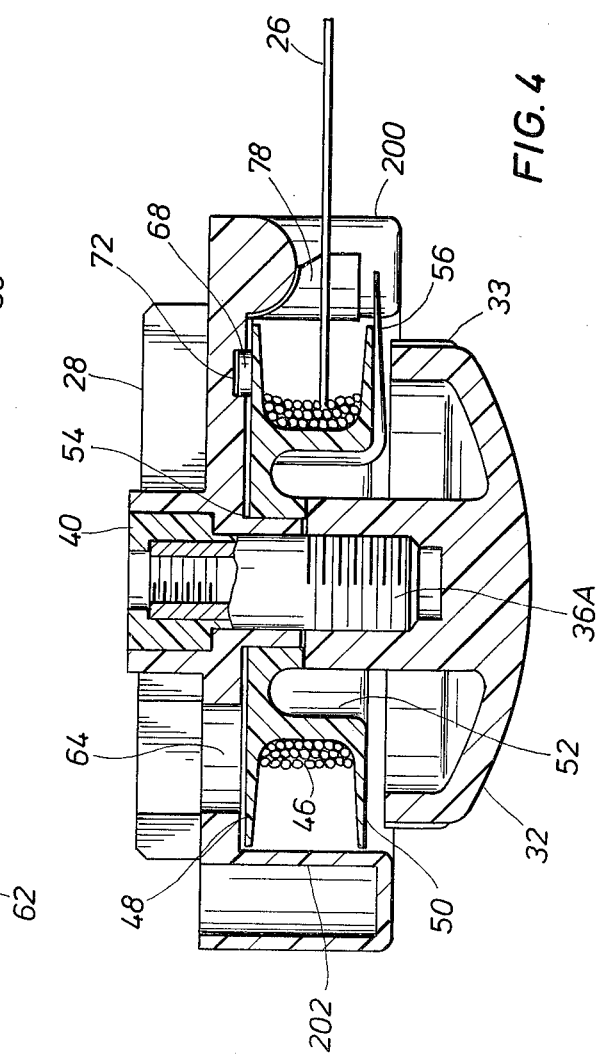

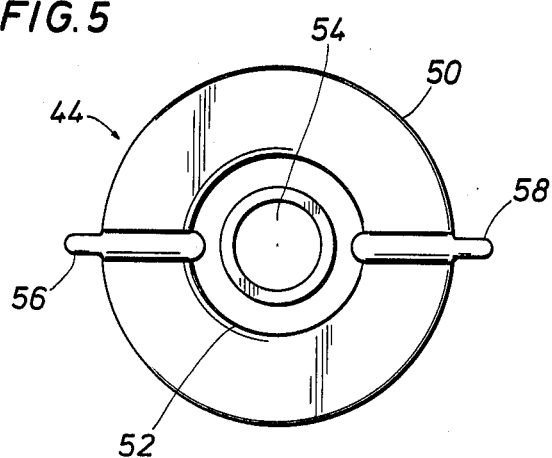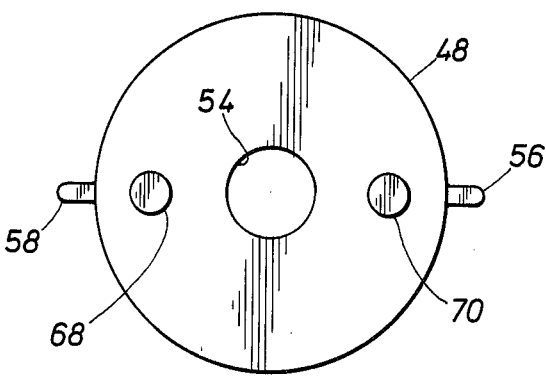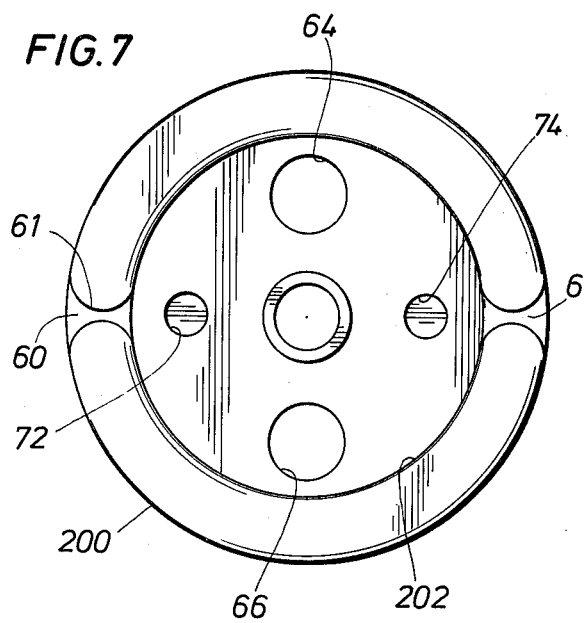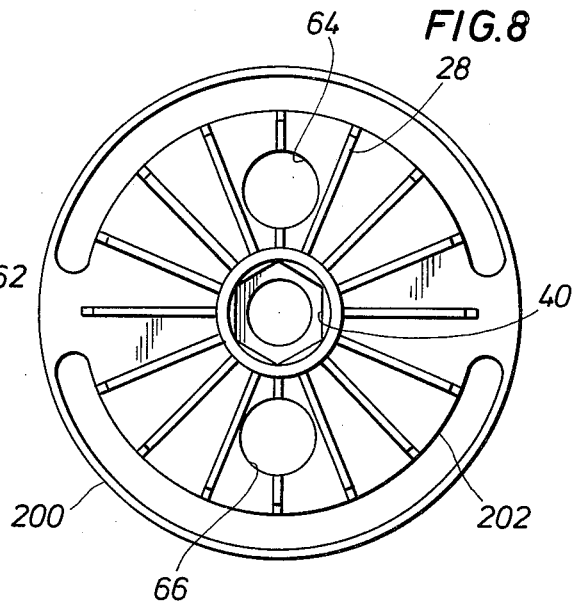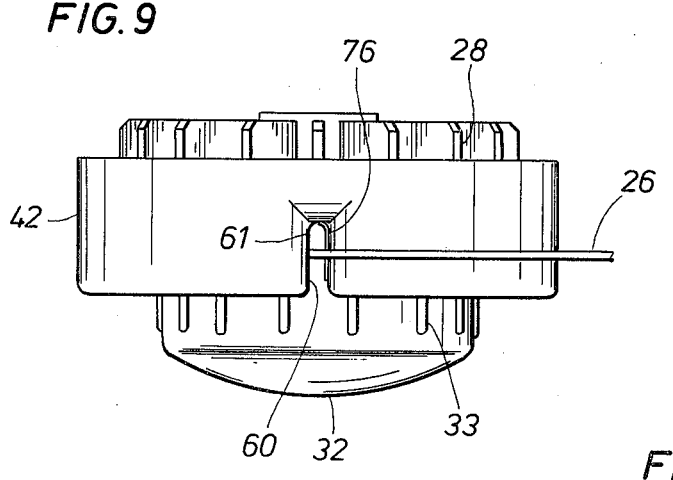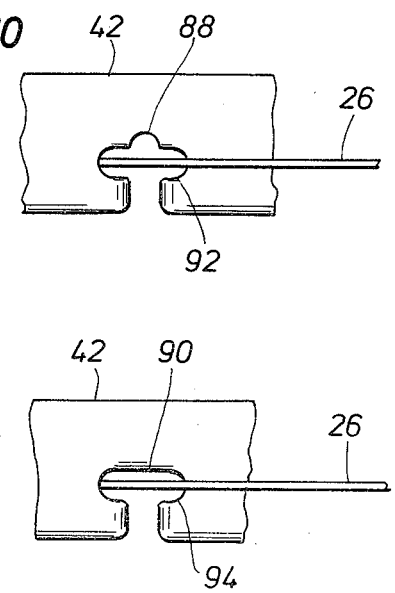

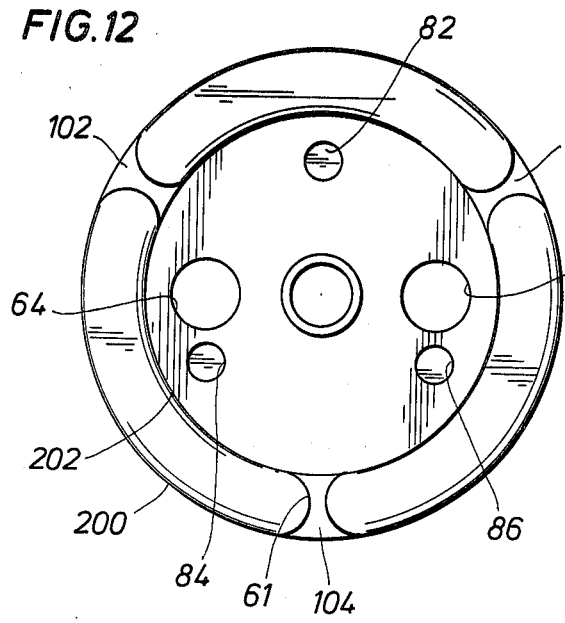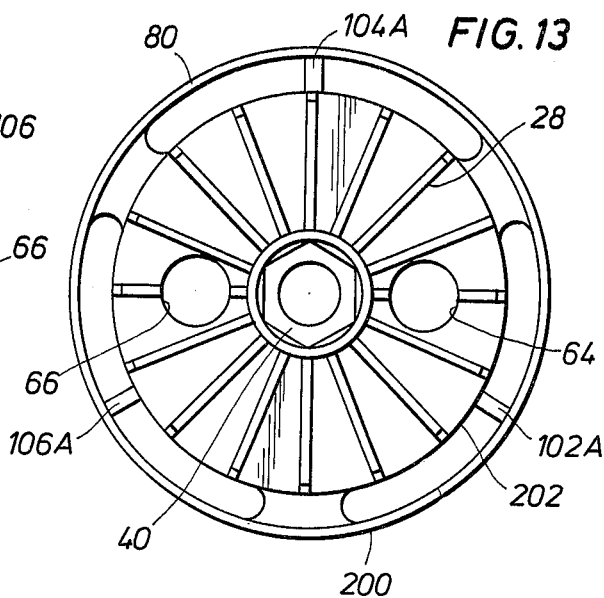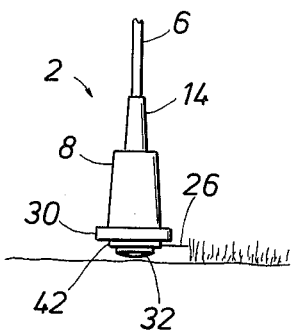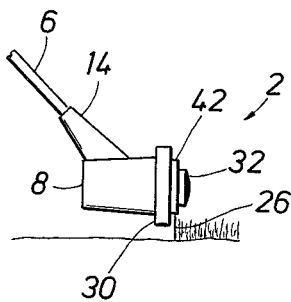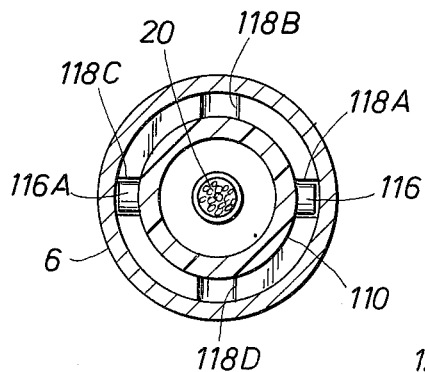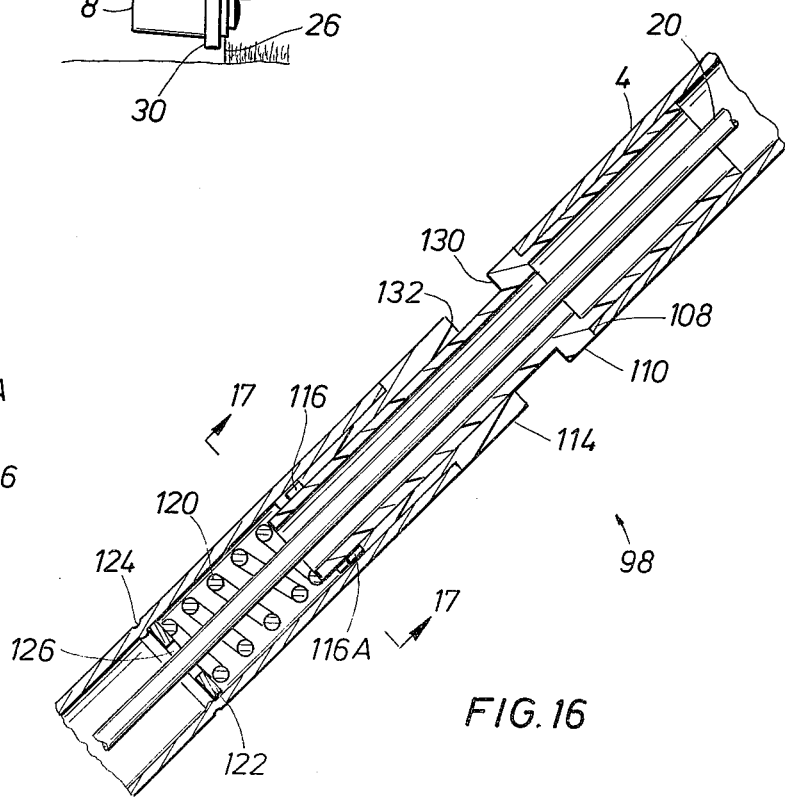

ROTARY CUTTING ASSEMBLY

BACKGROUND OF INVENTION

This invention relates to methods and apparatus for cutting vegetation and the like, and more particularly relates to improved methods and apparatus for cutting vegetation with a flexible non-metallic cord member.

It is well known to cut or mow grass, weeds and other vegetation with a moving flail-like member, and it is now well known to employ a flexible non-metallic cord member for the purpose of cutting vegetation located in places which are inaccessible to apparatus employing a rigid steel blade. In particular, the trimmer which is marketed in various forms under the trademark WEED EATER, and which is described in U.S. Pat. Nos. 3,708,967; 3,826,068; and 3,859,776; is now widely known and used for this purpose.

This invention relates to an improved cutting assembly in the form of a rotary head for a rotary edger, trimmer or the like. The preferred embodiment in the form of a portable hand-held type mowing and edging tool wherein the cutting element is safe in most uses and avoids the hazardous conditions created by prior art devices.

SUMMARY OF INVENTION

This invention is for an improved cutting assembly for a rotary mower, edger, trimmer or the like. It includes a body member arranged for rotation about an axis generally perpendicular with or normal to the cutting plane. It preferably includes one non-metallic cutting line attached to the body member for rotation therewith in the cutting plane, although a pair of lines may be effective for present purposes under proper circumstances. More particularly, provision is made via metallic bearing surfaces for the reduction of friction between the cutting lines and portions of the apparatus and between adjacent portions of the cutting lines, and for higher speed and cutting efficiency.

The line is characterized by having an effective working length to diameter ratio, and of a material composition such as to render the line flexible and yielding to the extent that it is substantially incapable of causing damage or injury when impacting against persons, animals, trees, etc. Preferably, the effective working length to diameter ratio of the line is in the order of 75:1. Certain embodiments of the invention include means for detachably securing the line or lines to the body member so that the same may be replaced after wear or breakage resulting from impact of the line against fences, trees, walls, etc., as well as vegetation. Provision is also made within the body member for storing additional cutting line in the nonworking condition whereby the effective working length of the line or lines may be lengthened at desired times as the working length becomes shortened due to breakage or fraying during use thereof. Certain embodiments of the invention may have line storage means supported in the body member, which storage means are in the form of a spool which is locked from rotation, but which may be disengaged whereby additional line may be paid out to replace or replenish the effective working length of the cutting line when it becomes shortened during use. Another particularly significant feature is that the configuration of the cutting head is such as to prevent angular deformation or "kinking" of the cutting line, as will hereinafter be explained in detail.

In one particularly ideal embodiment of the present invention, a circular head member is provided which contains a single spool located concentrically therein in coaxial alignment with the motor shaft, the spool having a single strand centrally wound thereabout so as to present a free travelling end extending from the periphery of the head assembly. Alternatively, in a two exit head embodiment, a pair of two separate strands may be wound about the spool to present two ends as cutting members extending oppositely of each other from the periphery of the head assembly.

It has been discovered that when a three exit head is employed for present purposes, greatly improved balance of the cutting head is achieved when the strand is extended, as compared with two-exit heads. Consequently, in an alternative ideal embodiment of the present invention, a single strand may be wound about the spool to present to three or more exits spaced equal distances around the periphery of the head assembly.

In addition to the various other problems of the devices of the prior art, it has also been discovered that excessive line breakage will occur from another cause not heretofore discussed. As hereinbefore explained, the subject cutting devices operate by revolving the circular cutting head at a relatively high velocity, whereby the cutting lines are caused to be more or less rigidly and radially extended from the periphery of the head. During such revolvement, however, these lines are caused to vibrate longitudinally as well as laterally.

It is a feature to reduce the friction between the cutting line and any portion of the cutting device against which the cutting line is caused to rub. In a particularly suitable embodiment of the present invention, therefore, such friction is reduced by providing that the nylon cutting lines be disposed against metallic bearing surfaces preferably composed of brass or some other suitable metal or other substance.

It is a further feature of the herein described invention to substantially reduce the up and down deflection of the cutting line in the vicinity of the peripheral apertures, and to keep the line in one fixed cutting plane. In a particularly suitable embodiment of the present invention, therefore, such deflection is reduced by employing bulbous shaped exit apertures wherein the cutting line is forced into the constricted portion by the centrifugal forces caused by rapid head revolution. The bearing surfaces of brass or other suitable metal or other substance hereinbefore described may be suitably shaped and inserted in the said bulbous shaped apertures.

It is another advantageous feature of the present invention to provide maximum operator convenience and ease of operation. Accordingly, the device has been equipped with a two-piece adjustable handle to enable an operator to easily adjust the attitude of the cutting head to various cutting planes.

These and other features and advantages of the present invention will become apparent from the following detailed description, wherein reference is made to the figures in the accompanying drawings.

IN THE DRAWINGS

FIG. 1 is a pictorial view showing the entire cutting apparatus.

FIG. 2 is a pictorial side view, partly in cross-section, of the apparatus depicted in FIG. 1, wherein the mechanical features and configuration of the apparatus are set forth in greater detail.

FIG. 3 is an exploded assembly drawing of one embodiment of the head and spool assembly.

FIG. 4 is a cross-sectional view of the head assembly depicted in FIG. 3 in a static or nonrotating position showing the cutting string mounted therein.

FIG. 5 is a bottom view of the spool assembly depicted in FIG. 3.

FIG. 6 is a top view of the spool depicted in FIG. 3.

FIG. 7 is a bottom view of the head depicted in FIG. 3.

FIG. 8 is a top view of the head depicted in FIG. 3.

FIG. 9 is a side view of the vaned head in a static or nonrotating position.

FIG. 10 is a partial side view representation of one embodiment of a cutting string aperture.

FIG. 11 is a similar partial side view representation of another embodiment of a cutting string aperture.

FIG. 12 is an alternate three windowed embodiment of the apparatus depicted in FIG. 7.

FIG. 13 is an alternate three windowed embodiment of the apparatus depicted in FIG. 8.

FIG. 14 is a partial view showing the portable apparatus being used to cut grass or weeds in the upright level position.

FIG. 15 is a similar partial view showing the apparatus being used to cut in the perpendicular or sideways position.

FIG. 16 is a partial cross-sectional view of the handle of the apparatus showing the attitude-adjusting mechanism for positioning of the cutting head as shown in FIGS. 14 and 15.

FIG. 17 is a cross-sectional view taken along line 17—17 of FIG. 16 showing the attitude-adjusting mechanism of the handle of the apparatus.

DETAILED DESCRIPTION

Referring now to FIGS. 1-2, a portable type mowing and edging device generally designated by the numeral 2 is shown, and which is of the type preferred for lighter tasks in residential-size plots or areas, and the like, where electrical power is immediately and conveniently available to the operator. Accordingly, the apparatus may be composed of a two-piece adjustable tubular member 4 and 6 having a casing 8 containing electric motor 10 mounted at one end, which motor drives a string cutting head 42. The handle 6 is removably attached to and supports casing 8 by screws 15 insertable in shank 14. Such a device 2 is portable and is hand held and manipulated by an operator by means of trigger handle 16 and intermediate handle 18. Handle 16 is attached to tubular member 4 by screws 25, whereas handle 18 is attached to tubular member 4 by an easily adjustable wing-nut assembly 27. Power may be applied to the motor 10 through a conventional electrical-type insulated cord or conductor 20, having an appropriate plug at one end (not shown), and having its other end passed through the tubular members 4 and 6 for connection with the motor 10 by means of connectors 17 and 19 at contacts of a full-wave bridge rectifier 21. An appropriate ON-OFF switch or trigger 22 may conveniently be located adjacent the handle 16 at the upper end of the tubular member 4, for interconnection with the conductor 20 and motor 10. The cutting plane of the cutting string 26 may be easily arranged in either a horizontal or vertical position (FIGS. 14 and 15) or tilted to any angle, to cut along sidewalks, around trees and rocks, and along fences and the like, where it is either unsafe or difficult to cut with conventional apparatus, merely by turning and manipulating handles 16 and 18. Additionally, an attitude adjustment mechanism 98 may be provided to enable tube member 6 to telescopically, rotatably and incrementally lock with respect to tube member 4, wherein an operator may adjust the attitude of the cutting head in relation to the ground, as will be described in more detail hereafter with regard to FIGS. 16 and 17.

Referring more particularly to FIG. 2, there may be seen a larger and more detailed pictorial representation of the apparatus depicted more generally in FIG. 1. More particularly, the apparatus or vegetation cutter 2 depicted therein may be seen to include a hollow casing 8 or the like, with a single string circular cutting head 42 which is rotated by the shaft 36 of an electrical motor 10 of suitable design mounted within casing 8.

The cutting head 42 may be further seen to include cutting strand 26 extending laterally from the cutting head 42 through either aperture 60 or 62 (FIG. 3) of suitable configuration, a distance which is a function of the present invention as will hereinafter be explained. As further indicated, the casing may have a circular flange portion or shield 30 for preventing the cutting head 42 from being brought into injurious contact with a wall or tree during its rotation by motor 10.

When the motor 10 is inactivated and the rotary head 42 is in a static condition, the cutting strand line 26 will tend to flexibly dangle from one of the equally spaced-apart windows 60 and 62 (FIG. 3) to the extent permitted by inherent characteristics of line 26. When the cutting head 42 is rotated at normal operating velocities, however, the line 26 will tend to stand out rigidly (but also flexibly and yieldably) from the periphery of the cutting head 42 as indicated in FIGS. 1 and 2.

As will hereinafter be explained in greater detail, a spool containing surplus line is removably insertable into cutting head 42, and held in place by glide ball 32. In addition to securing the spool in place, guide ball 32 allows the device to be operated if desired without having to be continually and solely supported by an operator. The device 2 may be rested and propelled forward on the glide ball 32 when in operation if this type of cutting is found to be desirable. Generally the unit is supported by the operator at handles 16 and 18.

An electric motor operates in an optimum manner when the air around it is allowed to be circulated or otherwise cooled. The hollow casing 8 effectively allows air to freely circulate around motor 10, therefore providing forced air circulation. The plurality of upstanding fins 28 located on the top of cutting head 42 and extending radially outward from the axis thereof provide forced circulation of air about motor 10 when motor 10 rotates head 42. Rapid rotation of head 42, and hence of fins 28, causes said fins to create a low pressure zone within casing 8, whereby air is drawn from the atmosphere through openings 34 in lower tubular member 6 and passed into and through shank 14 and casing 8 and around the motor 10 and expelled through the spaces 38 between flange 30 and cutting head 42. This circulation of air sufficiently cools motor 10 to provide maximum efficiency and minimal ambient heat rise. Moreover, the openings 34, located in tubular member 6, are sufficiently removed from the cutting area that cut grass or other debris flung up by line 26 is not likely to enter openings 34 along with the air.

The cutting line 26 may be composed of a variety of suitable materials as, for example, an elastoplastic extrusion which has been stretched to align the molecules axially. An example of such line is a nylon monofilament of the type commonly used for fishing line. However, other lines may be used, as for example, yarn, cord, rope, twine, braided line, or monofilament, whether described as elastoplastic, elastomeric, natural fiber, or synthetic fiber, and whether compounded of several materials. Nevertheless, there are certain parameters within which the lines must fall in order to be effective.

The cutting line 26 should preferably have sufficient fatigue, abrasion, impact resistance, and tensile strength to allow a reasonable service life, and should have as small a diameter as is consistent with the foregoing parameters so that the sharpest cutting edge is provided for effecting cutting of the grass, weeds, or the like. The line 26 should further preferably be as lightweight as possible, so that when the line shears or breaks during use and pieces are thrown from the cutting head 42, such pieces will travel only a limited distance and will strike persons or other objects in the immediate vicinity with little or no appreciable impact.

Referring now to FIGS. 3–9, it may be seen that the lower end of the drive shaft 36 from motor 10 is arranged for threading engagement with a drive adapter or attachment member 36A. Drive adapter 36A extends downwardly through head 42 and is arranged at its lower extremity for threading arrangement with glide ball 32. Drive adapter 36A inserts tightly into head 42 and retains its relationship with head 42 by means of its hex head 40 which is insertable into head 42. Rotation of drive adapter 36A by drive shaft 36 causes head 42 to also rotate, thereby extending the strings to perform a cutting function.

Glide ball 32, in addition to engaging drive adapter 36A and securing said drive adapter 36A in relationship with head 42 so as to provide axial rotation thereof, also releasably secures spool 44 within head 42 as shown in FIG. 4. Spool 44 contains spare cutting line 46 therein, which is arranged for paying out at predetermined times and at predetermined lengths to vary the effective working length of the cutting line 26. Removal of glide ball 32 by unthreading it from drive adapter 36A allows removal of spool 44 so that a fresh full spool may be inserted into head 42, or spool 44 may be rewound with replacement line, or the like. The external circumference of glide ball 32 may be provided with equally spaced-apart vertical lineal protrusions 33 to insure a better grip for easier removal. Holes 64 and 66 as seen in FIGS. 7 and 8 are provided in head 42 so that after glide ball 32 is removed from drive adapter 36A, spool 44 may be more easily removed from head 42 by pressing manually with a finger or other object through the holes 64 and 66 to thereby force the spool 44 to disengage from head 42.

Spool 44 as seen in FIGS. 3, 5, and 6 is composed of a bottom wall 48 and a top wall 50 spaced a predetermined equidistance by hub 52. Interior of hub 52 is an aperture 54 in wall 48 through which drive adapter 36A passes when threaded into glide ball 32. The spool top wall 50 has insert knobs or ridge members 56 and 58 which correspond to and insert into window apertures 60 and 62 in head 42 when spool 44 is in place within head 42. Knobs 56 and 58 position spool 44 and close or seal off the bottom of window apertures 60 and 62, whereby the cutting line 26 is effectively prevented from being deflected as will hereinafter be more fully explained. The spool bottom wall 48 is provided with cylindrical alignment protuberance tabs 68 and 70 extending downwardly therefrom. When the spool 44 is placed within head 42, the protrusions 68 and 70 harmoniously insert into corresponding cylindrical depressions or detents 72 and 74 in head 42 as seen in FIG. 7, thereby positioning and further securing spool 44 therein for rotation along with head assembly 42.

Referring now to FIGS. 12 and 13, there may be seen a top and bottom view of another embodiment of the present invention. In particular, the depicted head 80 may be seen to be generally similar to the head 42 illustrated in FIGS. 3, 7, 8, and 9. The principal difference may be seen to be the fact that, in the head 42 previously described, the head is preferably provided with two window apertures 60 and 62 wherefrom a cutting string may protrude. The head depicted in FIGS. 12 and 13 however, is preferably provided with three window apertures 102, 104, and 106 equally spaced-apart around the circumference of head 80, from which a cutting string may be extended. It can readily be seen that use of the three-window aperture head 80 requires modification of spool 44 (FIG. 3). More particularly, use of head 80 requires that three insert knobs 56, 58, for example, be located on spool top wall 50 (FIG. 6) rather than the two shown, so that the three knobs may correspond to and insert into window apertures 102, 104 and 106, as hereinbefore described. In addition, the spool bottom wall 48 is modified to provide three cylindrical alignment protrusions extending therefrom, similar to the protrusions 68 and 70 hereinbefore described which protrusions harmoniously insert into corresponding cylindrical depressions 82, 84 and 86 within head 80.

It may be clearly seen in FIGS. 2–4 that in one embodiment a single line 26 extends from the body of the cutting head 42, and through one of the two window apertures 60 and 62. In the embodiment therein depicted, one end of the line 26 is inserted through aperture 55 in the spool hub 52, and then knotted together to prevent disengagement therefrom. The line 26 is then preferably wound about the spool 44, oppositely of the direction of the rotation of spool 44 and head 42, and then extended through one of respective window apertures 60 and 62, as hereinbefore stated.

The line 26 may be unwound and paid out from the spool 44 without removing the spool 44 from the head 42, by drawing it out of one of respective window apertures 60 and 62 and simply pulling down on the line 26 to the next window aperture, since the top wall 50 of the spool 44 is stiff but resilient. It is to be noted, that a spool modified as hereinbefore described for use with the embodiment of the cutting head depicted in FIGS. 12 and 13 may be similarly wound and unwound with cutting line.

In an alternate embodiment of the present invention, a pair of cutting lines 26 may be provided but no additional structure is required to provide this dual cutting line feature. For example, and in light of FIGS. 3 and 4, the empty spool 44 is wound as above. However, in the dual cutting line embodiment, the line 26 is first doubled along its length thereby providing two free ends. That portion of the line that is doubled is inserted through aperture 55 and knotted as above. The doubled line is then wound onto the spool until the two free travelling ends are reached. Each free end of the line 26 is then extended through one of the respective window apertures 60 and 62, thus providing a head assembly 42 including a pair of cutting strands 26. To extend either of the lines, it is then merely required to pull down on the line as seen in FIG. 4 until that line reaches the next window aperture. Since wall 50 is resilient, the line can be pulled along the space defined by wall 50 and the inner periphery of head 42 until it reaches the next window aperture. The other line may be extended or paid out in similar fashion.

It has further been determined that the extended length of the cutting line is also a direct function of the size of the cutting head, although the precise explanation for this is not immediately apparent. In any event, it can be stated that this provides that the cutting line should have a free traveling or unsupported length of not substantially less than 0.50 times the diameter of the cutting head, nor substantially more than 2.2 times such diameter, and this appears to be especially significant in the operation of the embodiment of the invention depicted in FIGS. 1-9.

As hereinbefore explained, it is a feature of the present invention to provide against excessive string or line breakage by substantially friction between the surface of the cutting line 26 and other objects such as bearing portions of the rotary head, or adjacent surfaces of the cutting line itself. Referring now to FIG. 3, the two window apertures 60 and 62 are each composed of a pair of curvilinear and spaced apart sidewalls 61. In this embodiment of the present invention, the cutting line 26 is composed of a coiled portion 46 (FIG. 4) wound about the spool 44, and a free travelling end portion extending along a tangent thereto outwardly through one of the respective window apertures 60 and 62. Accordingly, the line tends to abut the trailing one of the pair of sidewalls 61 composing the respective one of the two windows 60 and 62, rather than the sidewall 61 which leads the line as it is carried arcuately about by rotation of the cutting head 42.

As also hereinbefore explained, the cutting line 26 tends to vibrate longitudinally as the cutting head 42 is rotated, and thus to oscillate laterally against the trailing sidewall 61 of one of the windows 60 and 62 in a manner to generate sufficient localized heat to at least partially melt the cutting line at a point along its length where it contacts the said trailing sidewall 61. The window insert knobs 56 and 58 aid in minimizing such rubbing by tending to hold the line immobile at these points, but such holding effort as may be exerted by the inserts 56 and 58 must of necessity be limited so as not to restrict the ease whereby new lengths of the cutting line may be paid out as desired.

It has been found beneficial, therefore, to provide these trailing sidewalls 61 with metallic bearing element inserts 76 and 78 preferably formed of a material which has a reduced tendency to develop friction from engagement with the vibrating cutting line, and further preferably having a smooth or polished surface for carrying the cutting line. These inserts 76 and 78 may be formed of a variety of different materials which are suitable for such purposes, but it has been found that a polished metal such as brass or stainless steel is especially suitable.

It should be noted, of course, that if the rotary body 42 is itself formed of brass or stainless steel or the like, or if at least that portion of the rotary head 42 which constitutes each trailing sidewall 61 is formed of such material, then there is no need for the inserts 76 and 78 as separate components in the cutting head 42. For various reasons hereinafter described in greater detail, however, it is highly desirable to form the rotary head 42 and other major components out of a high impact plastic such as nylon or the like, and although such a material may be provided with sidewalls 61 having a smooth high gloss finish or surface, a nylon-to-nylon vibratory engagement tends nonetheless to develop heat to an extent much above the melting point of nylon. Thus, it is preferable to form the rotary head 42 of plastic and to eliminate nylon-to-nylon contact by providing metal bearing inserts 76 and 78 as heretofore explained.

It has been determined through usage of the present invention that wherever metal-to-plastic contact can be established at such points of vibratory engagement, reduction or dissipation of unwanted heat is usually if not always sufficient to eliminate melting or softening of the cutting line in the manner hereinbefore described. This, of course, is not a practical remedy in those instances wherein vibratory engagement occurs at places such as between adjacent windings of the cutting line 46 (FIG. 4). On the other hand, application of a coating of suitable lubricant to the cutting line 46 will not only overcome this problem completely but will also further reduce frictional engagement and insulate those points wherein metal-to-plastic contact has also been achieved by means of the aforementioned inserts 78 and 78 or the equivalent.

As hereinbefore stated, any of several materials may be employed as a heat insulating lubricant for this purpose, and as also previously stated, common petroleum jelly has been found to be entirely satisfactory. Any of many other substances of suitable viscosity may be employed as a lubricant, however, provided such lubricant will adhere to the surface of the cutting line 46 whereby the entire line is adequately coated at all times.

Referring now to FIGS. 10 and 11, it may be seen that the windows 60 and 62 of FIG. 3 may be altered so as to provide bulbous shaped apertures 88 or 90 as shown, or any other similarly shaped aperture. Rapid revolution of head 42 will force cutting line 26 into constricted portions 92 or 94, thereby reducing the up and down deflection of the cutting line 26 in the vicinity of the windows 88 and 90 as hereinbefore discussed. Furthermore, the bearing inserts 76 and 78 (FIG. 3) as hereinbefore described may be suitably shaped and inserted into the bulbuous windows 88 or 90. It is to be noted that the alternate embodiment of the head 80 depicted in FIGS. 12 and 13 may likewise employ bulbous window configurations 88 or 90 disclosed herein.

Referring now to FIGS. 14 and 15, two methods or attitudes of operating the device 2 are depicted. FIG. 14 shows a partial view of device 2 being operated in a horizontal position with the cutting path described by cutting line 26 being essentially parallel to the ground. The lower portion of the handle 6 is shown supporting casing 8 by means of shank 14. Cutting head 42 is shown with cutting line 26 extending therefrom. In actual practice, much of the grass or weeds to be cut will be close to the ground, and therefore the device 2 will have to be tilted slightly to cause the cutting string 26 to cut close to the ground. In this regard, glide ball 32 may be used to allow the unit to "ride" the ground as the cutting operation takes place, and the convex outer lower shape of the glide ball 32 enables an operator to conveniently tilt the unit 2 to any desired angle.

Referring more particularly to FIG. 15, the unit 2 depicted in FIG. 14 is shown in the alternate vertical attitude. The device 2 may be used in this attitude to trim areas otherwise not accessible, trim in a straight line by "trenching" a grass plot in the conventional manner, or the like.

Proper manipulation of handles 16 and 18 (FIG. 2) of apparatus 2 may result in either a horizontal or vertical cutting attitude as hereinbefore described and depicted in FIGS. 14 and 15. However, attitude adjusting means 98 as shown in FIG. 16 may be incorporated between upper and lower tubular members 4 and 6, respectively, to facilitate attitude adjustment by allowing tubular members 4 and 6 to be axially rotated and telescopically arranged with respect to each other in increments of 90°.

Referring more particularly to FIGS. 16 and 17, upper tubular member 4 is shown terminating at its lower end 108 with tubular insert 110 suitably permanently affixed thereto. Inserts 110 and 114 are axially aligned, and insert 110 extends beyond member 4 and inserts snugly but slidably into insert 114. Near the lower extremity of slidable insert 110 and affixed thereto are two protruding knobs 116 and 116A, rectangular in cross-section, and releasably retained by slots 118A-D whereby insert 110 may be rotated axially within insert 114. Spring 120 is axially aligned and contained within tubular member 6 between insert 110 and washer 122. Washer 122 retains spring 120 in place and is itself retained in position by crimp 124 in the circumference of tubular member 6. Electrical cord 20 may be seen extending substantially through the center of aperture 126 in washer 122, and further through the axial center of spring 120, then through the axial centers of inserts 110 and 114, and through the axial centers of tubular members 4 and 6. Thus, it will be apparent that downward pressure in the axial direction on upper tubular member 4 and hence on insert 110, sufficient to overcome the upward bias exerted by spring 120 will cause tubular members 4 and 6 to converge and telescope until annular surfaces 130 and 132 contact. Knobs 116 and 116A will then be forced downwardly sufficiently to be disengaged from slots 118A and 118C. In this compressed mode, tubular members 4 and 6 may be axially rotated in opposite directions sufficient to rotate knobs 116 and 116A 90° within member 6 and align them with slots 118B and 118D. Removal of the downward pressure will cause spring 120 to force insert 110 and member 4 upward and to slide knobs 116 and 116A into slots 118B and 118D. In this manner, tubular member 4 may be rotated in 90° increments with respect to tubular member 6, thereby enabling an operator to choose between a horizontal (FIG. 14) or vertical (FIG. 15) cutting attitude while retaining handles 16 and 18 in the same convenient easy to hold attitude shown in FIGS. 1 and 2.

With reference again to FIGS. 12 and 13, a further feature of the present invention includes means whereby the three exit head embodiment may be balanced rotationally so as to not transmit unwanted vibrations to the motor shaft 36. Thus, to provide a smooth running and rotationally balanced head assembly 80, it is necessary to offset the weight attributable to the line 26 extending outwardly of one of window apertures 102, 104, 106. If for example as depicted in FIG. 12, a single cutting line passes outwardly of the periphery of head 80 via apertures 102, the mass of the peripherally extending portion of the line 26 will unbalance the head 80 in a rotational sense. Thus, the head at point 102 will include a mass that is not offset by a corresponding mass at a location diametrically opposite point 102. To overcome this deficiency, and with reference to FIG. 13, there will be seen three balancing ribs 102A, 104A, and 106A. Each balancing rib is located diametrically opposite its corresponding window aperture. Thus, for example, balancing rib 104A balances window aperture 104. When the head 80 is assembled for grass cutting operation and includes therein a full spool of line 26, the line is inserted into one of apertures 102, 104, 106. THe line extends outwardly of one of these apertures and acts as a flail to cut vegetation. Normally, a six inch length of line 26 is used for cutting operations. However, as noted above, it is this six inch section of line that causes head 80 to rotate in an unbalanced condition. It is therefore the function of the balancing ribs to offset this mass of the six inch flail. This is accomplished by constructing the balancing ribs to be of an amount of material equal in weight to the mass of the extended six inch flail section of line member 26. This weight of the balancing ribs will vary from unit to unit depending, of course, upon variable factors such as line diameter, line density, length of the flail portion of the line, and the particular materials of construction of the head 80, cutting line 26, and balancing ribs 102A, 104A, an 106A. Sufficient to say, however, that the balancing ribs have a mass equal to substantially equal to the mass of the extended cutting flail portion of line 26.

The curvilinear line bearing surface 61 of each of window apertures 102, 104, 106, is preferably formed by constructing the head member 80 of a pair of spaced apart walls 200 and 202 seen in FIGS. 12 and 13. Thus, wall 200 defines the outer periphery of head member 80 whereas wall 202 defines the inner periphery thereof. It will be seen that in FIG. 13, the balancing ribs 102A, 104A, and 106A, are placed between walls 200 and 202 and are positioned radially with respect to the axis of rotation of the head or housing member 80. As illustrated in FIG. 13, the space between walls 200 and 202 is otherwise open. It should be noted that the two exit head embodiment of FIGS. 7 and 8 is likewise of double-walled construction as hereinbefore explained with reference to FIGS. 12 and 13.

It will thus be apparent that this invention provides the art with a cutting device which can quickly, easily, and efficiently cut grass, weeds, and the like; over, under, around, and between rocks, culverts, and the like; and can cut around and between trees, posts, bushes, buildings, and other stationary objects, or the like. Further, this apparatus will be particularly safe for both the operator and others in the vicinity, in that the hazardous conditions present when prior art devices are used have been essentially eliminated. By making the apparatus available in a portable embodiment, the cutting plane can be effected in any direction so as to accommodate both cutting and trimming operations as heretofore described, thereby eliminating the need for manual labor in certain difficult cutting operations.

The apparatus of this invention can also be used successfully in yard trimming and cleaning operations where there is considerable debris, such as bottles, cans, papers, wood, wire and the like, without creating a dangerous condition in that the cutting elements of this device do not create missiles of such trash. Because of the nature of the cutting element of this invention, such objects are not thrown, but rather the cutting string acts in a resilient fashion, so as not to impart sufficient force to such objects to become missiles; or if they are thrown, they are projected at only a very low velocity as compared with cutting devices heretofore in use. Experience has shown that in operating an apparatus of this device with line of the type described, the cutting line may accidentally come in contact with the operator's shoes, articles of clothing, or the like, without serious injury as would be the case with prior art devices.

It will be apparent from the foregoing that many other variations and modifications may be made in the structures and methods described herein without departing substantially from the essential concept of the present invention. Accordingly, it should be clearly understood that the forms of the invention described herein and depicted in the accompanying drawings are exemplary only and are not intended as limitations in the scope of the present invention.

What is claimed is:

1. Apparatus for cutting vegetation and the like comprising:

Head means rotatable in a cutting plane and having a concentrically located spool-like storage portion and a peripherally located support portion having a curvilinear bearing surface in and substantially perpendicular to said plane and spaced from the axis of rotation of said head means, electrically actuated driving means for rotating said head means in said plane and about said axis, a flexible non-metallic line member having a portion coiled in said storage portion of said head means and further having an uncoiled portion initially extending tangentially from said coiled portion in said cutting plane to and across said bearing surface and further continuing radially outwardly from the periphery of said head means, a housing supporting and enclosing said driving means, tubular handle means attached at one end to said housing and including a switch associated with a handle at the other end, said tubular handle means including first and second sections and means for movably and telescopically mounting said first section within said second section, said means maintaining coaxial alignment of said first and second sections, said second section carrying said handle and said first section adapted to provide a second handgrip for the user's hands, stop means for limiting outward axial movement of said first section from said second section, biasing means for urging said first section from said second section until axial movement is limited by said stop means, said stop means comprising longitudinally interfitting slots and pins on said first section and second section whereby said first section and said second section are held securely in a first angular position, said slots and interfitting pins arranged to provide at least two angular positions between said first section and said second section, and said slots and pins being disengaged by inward axial movement of said first section into said second section whereby said first section is rotatable in said second section to another angular position, and said biasing means urge said first section outwardly from said second sections wherein said slots and pins interfit to secure said first and second sections in the selected angular position, and an electrical harness assembly including a rectifier connected between said switch and said driving means for actuating said driving means.

2. The apparatus of claim 11 wherein said slots and pins provide at least two angular positions of ninety degrees orientation between said first and second sections of said tubular handle means.

3. The apparatus of claim 1 wherein said slots and pins provide at least two angular positions between said first and second sections of said tubular handle means whereby said head means is oriented with the cutting plane in the vertical for edging and in the horizontal for trimming in the cutting of vegetation.

4. The apparatus of claim 1 wherein said slots are disposed longitudinally interiorly of said second section and said pins are disposed radially outwardly on said first section.

5. The apparatus of claim 1 wherein a second stop means limits the inward axial movement of said first section into said section section at a position where said pins are disengaged from said slots.

* * * * *